J. STOCKFLETH.
PROTECTING SHIELD FOR PLANTS.
APPLICATION FILED MAR. 7, 1916.
1,190,605.
Patented July 11, 1916.
3 SHEETS—SHEET 3.
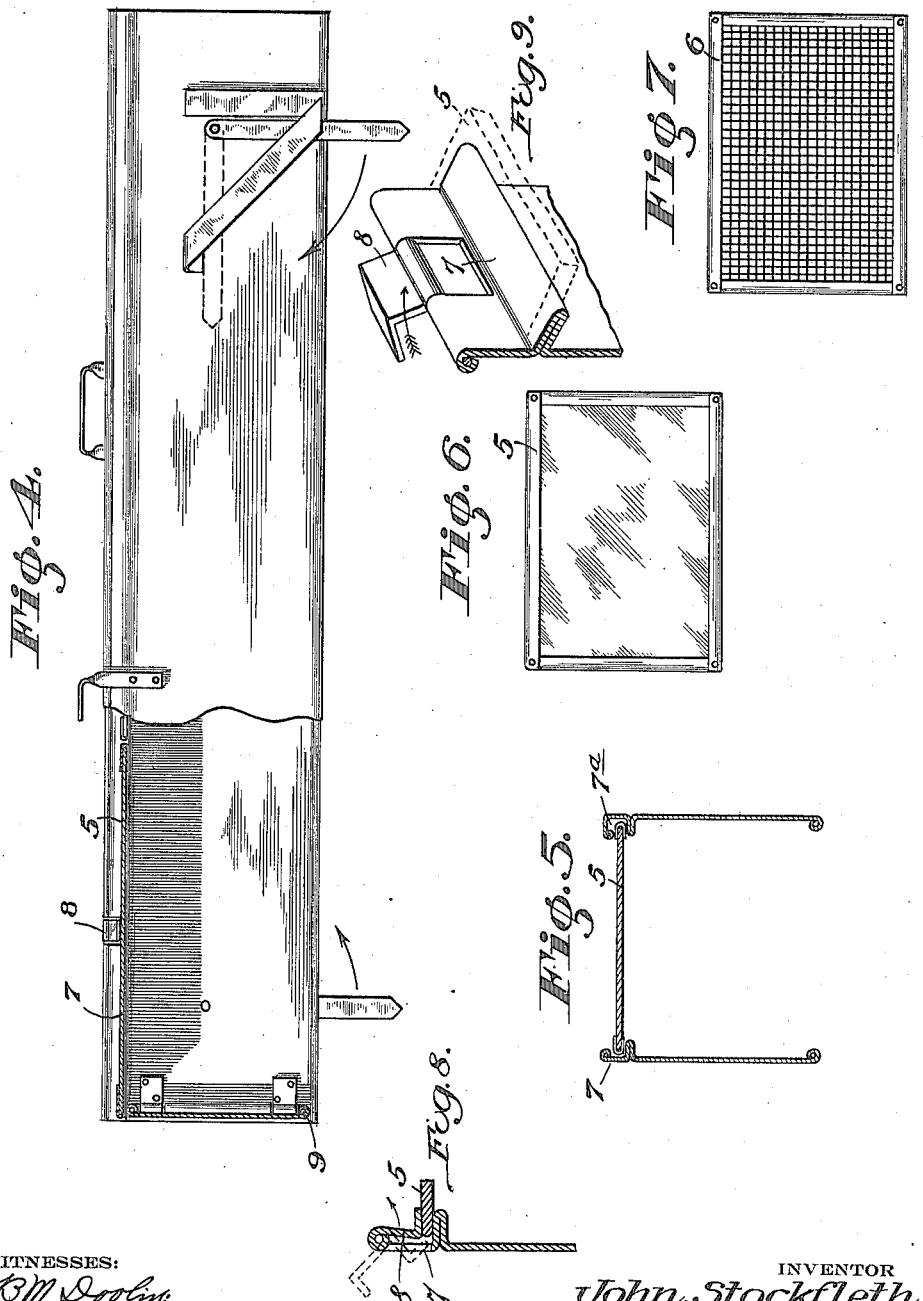
WITNESSES:
B.M. Doolin
L.J. Forde
INVENTOR
John. Stockfleth.
BY Strong & Townsend
ATTORNEYS

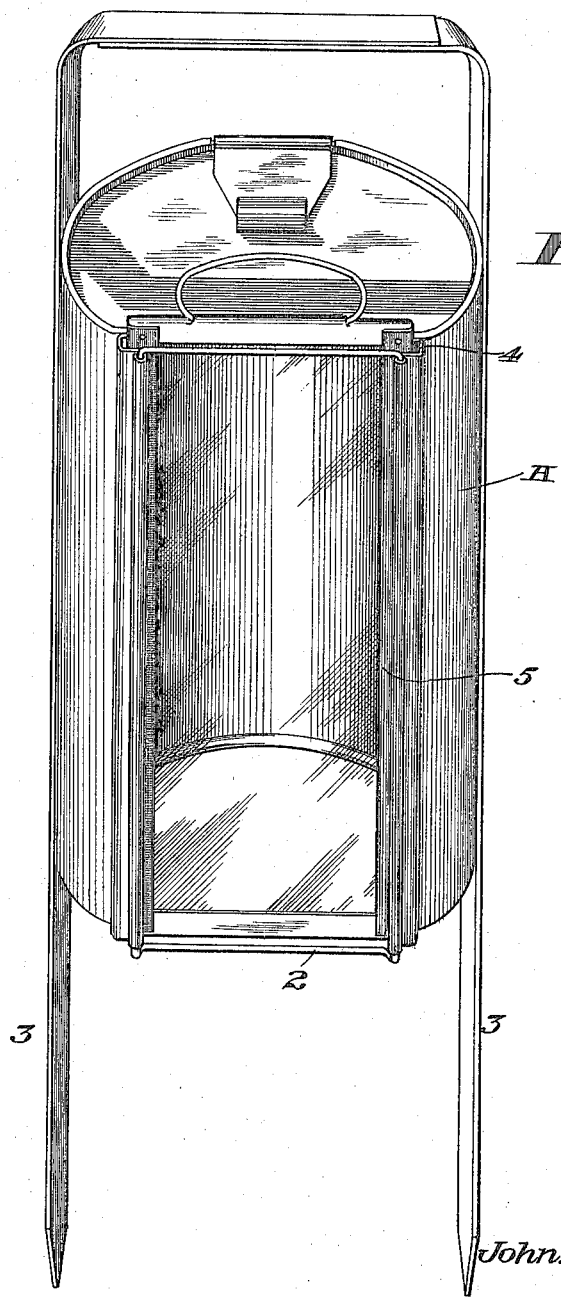

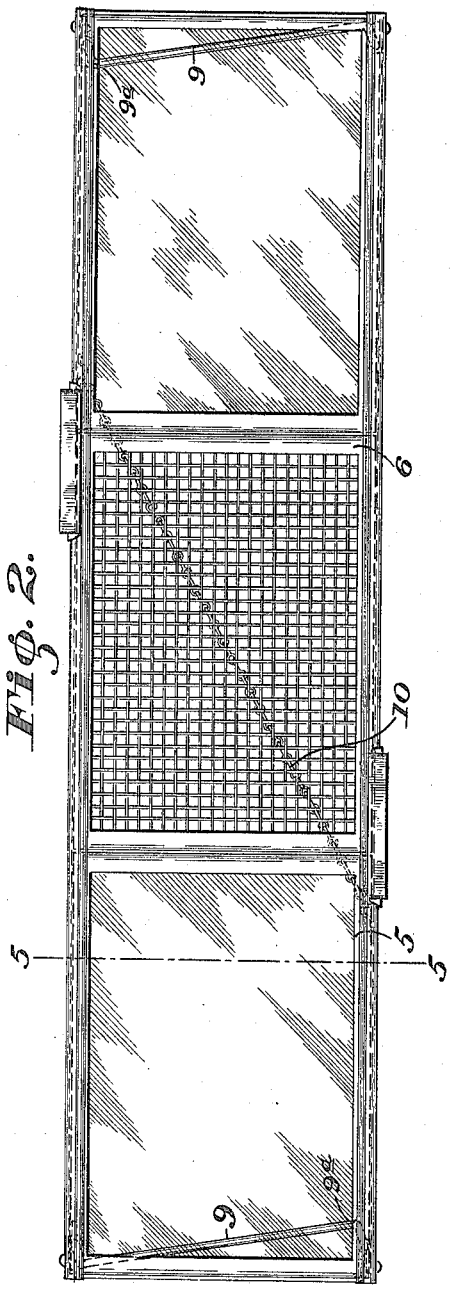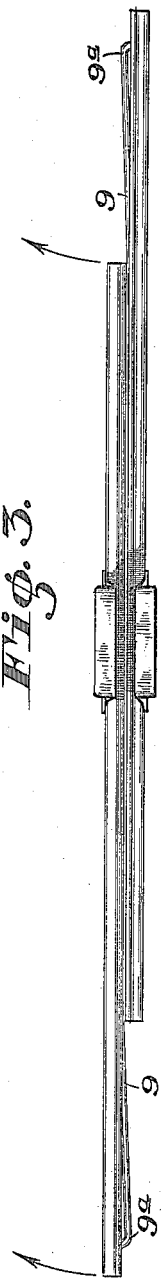

UNITED STATES PATENT OFFICE.

JOHN STOCKFLETH, OF SAN FRANCISCO, CALIFORNIA.

PROTECTING-SHIELD FOR PLANTS.

1,190,605. Specification of Letters Patent. Patented July 11, 1916.

Application filed March 7, 1916. Serial No. 82,655.

*To all whom it may concern:*

Be it known that I, JOHN STOCKFLETH, a citizen of the United States, residing in the city and county of San Francisco and State of California, have invented new and useful Improvements in Protecting-Shields for Plants, of which the following is a specification.

My invention is designed to provide a means for the protection of tender plants from the sun, wind, frost, and other adverse climatic conditions. It also serves to protect the plants from birds or other destructive animals.

The invention consists of a shield of suitable material, which is so shaped as to inclose a plant or a series of plants, having an open bottom, and suitable means for fixing the shield in the ground with sufficient rigidity. The shield may have openings at the sides or top which are adapted to receive a closure either of clear or shaded glass to admit the rays of the sun and keep out the cold, or of screen material which will allow both sun and air to enter. The shield may be made either round, square or other shape suitable for the particular use to which it is to be applied, either for single plants or for a series of plants which may be in line with each other. It can also be made foldable or rigid and provided with suitable handles for conveniently manipulating and carrying it.

It also comprises details of construction which will be more fully explained by reference to the accompanying drawings, in which—

Figure 1 is a view of the device arranged for a single plant. Fig. 2 is a plan view of a rectangular form of the shield in its open condition. Fig. 3 is a top view, showing the shield folded for transportation. Fig. 4 is a side elevation and partial section, showing the means for introducing the protecting plates or screens. Fig. 5 is a transverse section on line 5—5 of Fig. 2. Figs. 6 and 7 show attached plates or screens. Fig. 8 is an enlarged view of the folding locking plate. Fig. 9 is a perspective view of the folding locking plate.

The object of my invention is to provide a means for encouraging the growth of young and tender plants; and particularly means by which they may be either exposed to the light and air or partially or wholly protected from the same, or other destructive or climatic influences.

As shown in Fig. 1, the device consists of a suitably shaped casing A, of a size which will inclose a single one of the plants for which it is designed. This casing is bent into shape and may be open at the top and bottom and one side, or one end may be closed. In this case the lower end will be the open end and the device may be strengthened by a marginal wire 2. The casing is provided with rigid legs 3 which project below the bottom so as to be inserted into the ground to hold the article firmly in place, with the plant inclosed. The upper ends of these legs may form a bail or yoke by which the device can be conveniently handled. One open edge of the shield, in this case, is formed with guide grooves or channels 4, into which the sliding protecting plates 5 and 6 may be inserted, according to the requirements. It will be understood that this shield may, if desired, be tapered toward the top with a smaller opening than at the bottom. The shield may also be made rectangular in form, as shown in Fig. 2, to inclose a single plant, or it may be of considerable length. The edges are channeled, as previously described, to receive the plates 5 and 6 which are either of plain or clouded glass, or screen material, which are inserted into such grooves. I have also shown another manner for inserting such plates, in which a ledge 7 is formed in place of the grooves on one side so that the protective screens may be introduced into the groove 7$^a$ and upon the opposite side they will lie upon a ledge 7, as shown in Fig. 5. To hold them in place is shown a revoluble folding plate 8, turnable upon one of the rods or rails, which serves as a strengthening for the upper edge of the device. This plate is here shown as bent to a substantial right angle, so that when it is in locking position the projecting edge will rest upon the top of the screen and when turned to release the screen this plate is simply reversed so that its projecting angle is turned outside of the box. An opening is made in the side of the top of the shield in line with this plate, which enables it to be turned into either position, and it also allows the insertion of the finger to raise the removable screen from its position. The legs which enter the ground may be pivoted to the side of the rectangular shield so that they may stand vertically when in use, or when out of use, they may be turned up to lie alongside the shield.

When the shield is elongated for the protection of a number of plants in line, the two sides may be hinged together, by rods 9, the vertical portions of which form hinge pins and the transverse portions extend across from side to side and determine the distance between the sides. In order to collapse the sides and render the device convenient for transportation the upwardly extending handles upon opposite sides are placed in such a way that when the sides have been folded together, by turning about the hinge pins, these handles will lie together so that they form a single handhold. In order to allow the sides to fold closely together, I have shown a right angled bend 9ª, at the junction of the vertical and horizontal hinge and distance rods, and when the sides are folded together this angular portion will fold closely between the grooved sides which sustain the glass or screen frames. A suitable flexible member 10 may extend diagonally across between the sides, this member being foldable when the sides are brought together, and when extended it limits the movement of the sides away from each other and checks this movement when the sides are fully opened. Either or both ends of the shield may be closed either by fixed doors, which are hinged and turnable about the hinges, or such doors may be made slidable in grooves; the object being in any event to provide a means by which the shield may be entirely closed against frost or other cold weather and which may be opened under more favorable conditions. It will be manifest that any number of these shields may be placed in line with each other and retained in position by lugs riveted to one section and extending beyond the section, so that the next section may be introduced between those lugs and retained in alinement.

Having thus described my invention, what I claim and desire to secure by Letters Patent is—

1. A protective shield for plants and the like, said shield comprising parallel sides, hinged rods connecting said sides and capable of folding between the sides when closed, handles disposed diagonally with relation to the sides so as to meet and form a single handle when the sides are closed, said handles being pivoted to the sides and foldable to lie flat against the sides.

2. In a protective shield of the character described, side members having hinge and distance rods formed at each end and capable of turning to be opened or closed, and a flexible connection extending diagonally between the sides and co-acting with the hinged rods to retain the sides in their separated position.

3. In a device of the character described, side plates having securing legs adapted to extend below the bottom edge and pivoted so as to fold against the sides, said sides having the upper edges bent outwardly and then vertically to form a ledge to receive and support a screen, and a locking member consisting of a plate swiveled at the upper edge and having a right angled extension adapted to rest upon said plates or to be turned outwardly to release the plates.

4. A plant screen of the character described, including metal sides having lower edges and legs adapted to enter the ground, inturned flanges at the top, hinge rods connecting the ends and turnable to separate the plates, a flexible connection extending diagonally between the sides and coacting with the hinge rods to limit the opening movement, and screen plates adjustable in the flanges.

In testimony whereof I have hereunto set my hand in the presence of two subscribing witnesses.

JOHN STOCKFLETH.

Witnesses:
John H. Herring,
W. W. Healey.

Copies of this patent may be obtained for five cents each, by addressing the "Commissioner of Patents, Washington, D. C."